N. STRAUSSLER
COLLAPSIBLE STRUCTURE SUCH AS PONTOONS AND SEAPLANE FLOATS, DIVISIBLE INTO BOATS
Sept. 22, 1931. Original Filed June 7, 1926 Re. 18,204
Fig. 1.
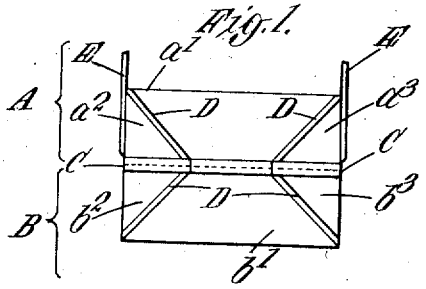
Fig. 2.
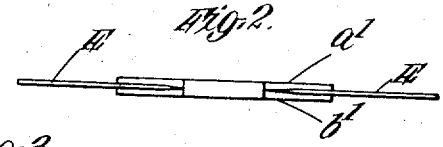
Fig. 3.
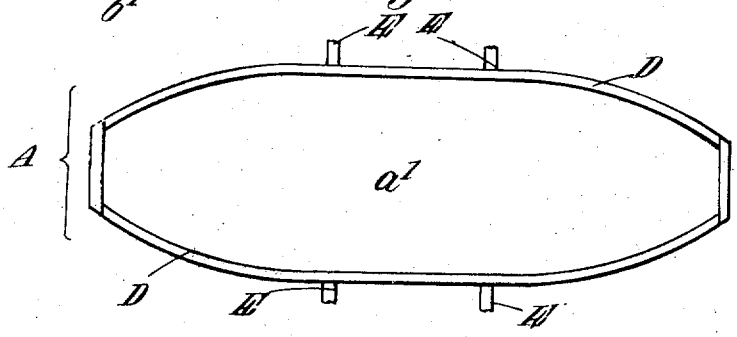
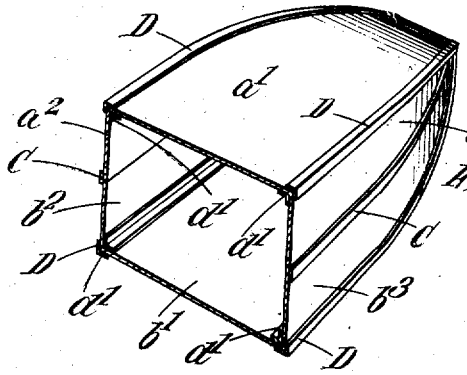
Fig. 4.
Fig. 5.
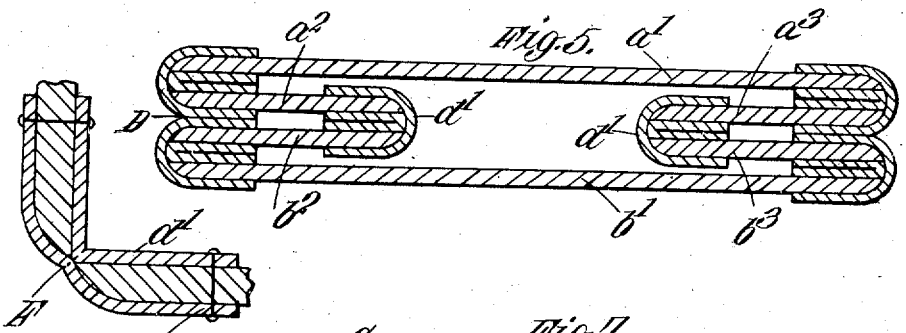
Fig. 6.
Fig. 7.
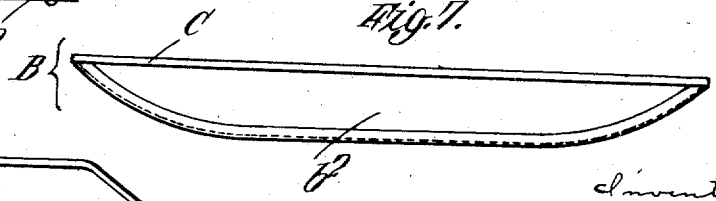
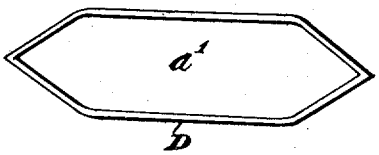
Fig. 8.
Inventor
Nicholas Straussler
By
Pennie, Davis, Marvin & Edmonds
Attorneys Reissued Sept. 22, 1931

Re. 18,204

UNITED STATES PATENT OFFICE

NICHOLAS STRAUSSLER, OF LONDON, ENGLAND

COLLAPSIBLE STRUCTURE SUCH AS PONTOONS AND SEA PLANE FLOATS, DIVISIBLE INTO BOATS

Original application filed June 7, 1926, Serial No. 114,148, and in Great Britain April 10, 1926. Divided and application filed March 24, 1927, Serial No. 177,976, Patent No. 1,720,701, dated July 16, 1929. This application for reissue filed June 16, 1930. Serial No. 461,662.

This invention relates to collapsible structures such as pontoons and seaplane floats, divisible into boats, and the present application is a reissue of a divisional application of my copending application Serial No. 114,148, filed June 7, 1926.

An object of this invention is to provide a hollow structure capable of flotation and adapted to collapse so that it can be packed flat for storage or transport. Another object of the invention is to enable such a structure when used as a seaplane float for example to be collapsed after rising from the water so as to reduce the air resistance to the flight of the seaplane, and expanded before again alighting on the water. Another object of the invention is to construct the said hollow structure in such manner that it can readily be divided into two boats as for example by cutting through the flexible part at which the fold or joint is located along which fold or joint the structure is adapted to be collapsed.

In order that the said invention may be clearly understood and readily carried into effect, the same will now be described more fully with reference to the accompanying drawings or diagrams wherein:—

Figure 1 represents in end elevation an expanded seaplane float exemplifying this invention.

Figure 2 is an end elevation of the same float collapsed.

Figure 3 is a plan of the same float when collapsed.

Figure 4 is a perspective sectional view of the same float expanded.

Figure 5 is a central cross section on a larger scale of the same float collapsed.

Figure 6 is a sectional view of one of the joints in the float.

Figure 7 is a side elevation of one of a pair of boats produced by longitudinally dividing the float represented in Figures 1 to 6.

Figure 8 is a plan of a float of a modified shape.

The float may be considered as consisting of two identical structures arranged face to face one over the other and flexibly secured together, these two structures being generally indicated by the letters A and B respectively in Figures 1, 3, and 7. The upper structure A comprises an upper mainly horizontal panel or roof $a^1$, and folding side panels $a^2$, $a^3$, the latter being represented as erect in Figures 1 and 4, and as laid horizontally under the panel $a^1$ in Figure 5. The lower structure B comprises similar panels $b^1$, $b^2$, $b^3$. The lower edge of the panel $a^2$ is straight and is joined to the straight upper edge of the panel $b^2$ by a longitudinal external strip of flexible material C, secured over their abutting edges. The lower edge of the panel $a^3$ is similarly joined to the upper edge of the panel $b^3$. The folding panels are hinged or jointed to the said upper and lower panels by flexible material D outside each joint and flexible material $d^1$ inside each joint.

The panels which are continuous and substantially integral throughout their length without transverse joints consist of material which is approximately rigid or approximately rigidly framed but capable of bending as hereinafter described, as for example plywood, in which case rivets or other fastenings may be passed through the plywood at intervals to prevent the plies or laminations of the wood from splitting apart when being bent. Each panel is connected with the adjacent panels by a flexible and waterproof material such as waxed or rubber coated canvas or webbing, with or without the addition of hinges at intervals. The outer edge of each horizontal panel which is jointed to an adjacent side panel comprises a curved portion coinciding exactly with a corresponding curved portion on the proximate edge of the said adjacent panel. Therefore although the panels $a^1$ and $a^3$, for example, can lie practically flat against each other when folded, yet when pulled into such a position that their respective central parts are at right angles to each other, the downward curve of the extremity of the panel $a^1$ corresponds with the adjacent inward curve of the extremity of the panel $a^3$. At the same time the upward curve of the extremity of the lower panel $b^1$ corresponds with the adjacent inward curve of the side panel $b_3$. The panels in the opposite halves of the float being similarly shaped and jointed to each other, the front ends of all the six panels of the float in the modification illustrated in Figure 8 can meet in a single point, while the rear ends of all the panels also can meet at a single point. Either or both ends of the panels $a^1$, $b^1$ may however be cut off on a line at right angles to the longitudinal axis of the structure so as to form a horizontal knife edge as illustrated in Figures 1–4 at the end of the float, in which case the pointed ends of the side panels $a^2$, $b^2$ meet each other but do not meet the pointed ends of the opposite pair of panels $a^3$, $b^3$.

At each side of the float are secured levers E for pressing in and drawing out the panels $a^2$, $a^3$, the movements of the upper part of the float thus caused being necessarily followed in counterpart by the lower part of the float. These levers are to be connected with suitable gear on the seaplane by means of which all the said levers can be turned in unison through arcs of approximately 90 degrees.

Instead of the two halves A and B of the structure being vertically superposed as above described, they may be laid side by side facing each other, and arranged to collapse in a vertical formation instead of in a horizontal formation as illustrated in Figures 2 and 5. In this modified arrangement the levers E would be connected to the two folding panels joining the two opposite curved upper edges of the two large panels, and the two lower folding panels would open out in unison with the upper folding panels by reason of the movements of the large panels.

When assembling the parts of the float waterproof glue is injected between the strips of webbing or the like and the wood to which they are attached, and the inner and outer strips may be stitched together as indicated at F in Figure 6 through the small spaces between the adjoining panels; the strips may also be secured by tacks, rivets, or other suitable fastenings at intervals.

Where the panels are made of plywood, they may be strengthened by inner or outer coatings of thin galvanized steel or other metal.

A large valve is preferably provided in the roof of the float to permit the rapid inward and outward passage of air during changes in the configuration of the float, this valve being of such a character as to prevent the entry of water into the float when the seaplane is resting or travelling on water.

When it is desired to divide the float into two folding boats, this can be done by cutting through the flexible strips C, (Figures 1 and 4) so that the float is transversely divided and the panel $a^1$ forms the bottom of one boat, the panel $b^1$ forming the bottom of the other boat. If it be desired to divide this float into two boats having longitudinally folding bottoms, it will then be necessary to cut through the comparatively rigid material along the major centre lines of the floor and roof, producing two boats laid on their sides facing each other horizontally, in which when turned through 90 degrees the boat bottom is constituted by the panels which were previously the folding wall panels of the float.

Although I have herein described and illustrated the construction of only one example of a collapsible floating structure adapted to enable the aforesaid objects of this invention to be obtained, it will be obvious that many variations of detail can readily be made therein without departing from the principles of this invention, the scope of which is defined in the following claims.

What I claim and desire to secure by Letters Patent of the United States is:—

1. A closed hollow structure adapted for flotation comprising two opposing main panels, each edge of each of said panels having a straight portion and a curved portion, and four longitudinally jointed half panels adapted to fold within said main panels, the said half panels each having one edge lying in a substantially horizontal plane flexibly connected with the adjacent half panel and its other edge comprising a straight portion and a curved portion and flexibly connected with the adjacent main panel.

2. A closed hollow structure adapted for flotation comprising mainly horizontal roof and floor panels with side panels adapted to fold inwardly between said roof and floor panels, each of said panels being continuous and substantially integral throughout its length, said structure consisting of material which is approximately rigid but has sufficient flexibility to be bent into curves when so required.

3. A closed hollow structure adapted for flotation comprising in combination a roof of semi-rigid material having a flat topped central portion and integral downwardly curved ends, said roof having at each end curved outer edges, two upper side panels flexibly jointed to said roof and having correspondingly curved edges adjacent said roof, a floor of semi-rigid material having curved outer edges, two lower side panels flexibly jointed to said floor and having correspondingly curved edges adjacent said floor, and flexible means for securing together the upper and lower pairs of said panels.

4. A closed hollow structure adapted for flotation comprising in combination a roof panel, a floor panel, two side walls each built up of two panels joined by a strip of flexible material, each of said six panels having a curved edge, the curved edges of the upper and lower wall panels corresponding with the curved edges of the roof and floor panels respectively to which they are jointed by strips of flexible material.

5. A collapsible closed hollow structure comprising in combination a mainly horizontal roof curved downward at each end, a mainly horizontal floor curved upward at each end, and longitudinally divided side walls curved inward at each end to meet the edges of the said roof and floor, each member of said side walls being flexibly jointed to the adjacent member thereof and also flexibly jointed to the roof or floor, whereby said members can be folded within the periphery of the said roof and floor, said roof and floor then becoming flat from end to end.

6. A collapsible hollow structure adapted to serve as a seaplane float having tapered ends and comprising mainly horizontal roof and floor panels with side panels flexibly connected to said roof and floor panels, each of said side panels consisting of upper and lower halves flexibly connected to each other, said structure being divisible into two separate boats by cutting through the flexible connections of the two halves of the side panels.

7. In a collapsible structure adapted for flotation, in combination with a main panel having at least one end tapered in width, a lateral panel jointed to each edge of said main panel and having its edge contiguous to said main panel of substantially the same contour as the lateral edge of said main panel, said panels being continuous from end to end and comprising material that is approximately rigid but sufficiently flexible to be bent into curves, and flexible means enclosing the edges of said panels both interiorly and exteriorly thereof and flexibly connecting each of said lateral panels to said main panel whereby said lateral panels may be folded into parallel relation with said main panel or moved into a position substantially at right angles thereto.

8. In a collapsible structure adapted for flotation, in combination with a main panel having at least one end provided with curved lateral edges, a lateral panel jointed to each edge of said main panel and having its edge contiguous to said main panel of substantially the same contour as the lateral edge of said main panel, and means completely enclosing the edges of said panels and forming a flexible hinge connecting each of said lateral panels to said main panel whereby said lateral panels may be folded parallelly to said main panel or moved into a position substantially at right angles thereto.

9. In a collapsible structure adapted for flotation, in combination with a main panel having at least one end provided with curved lateral edges, a lateral panel jointed to each edge of said main panel, said panels being approximately rigid but sufficiently flexible to be bent into curves in the direction of their length, and means extending throughout the length of the contiguous edges of said main and lateral panels and flexibly connecting said lateral panels to said main panel at both the inner and outer sides of each of said panels whereby said lateral panels may be folded parallelly to said main panel or moved into a position substantially at right angles thereto.

10. In a collapsible structure adapted for flotation, in combination with a longitudinally continuous main panel having at least one end tapered in width, a lateral panel jointed to each edge of said main panel, and means flexibly connecting each of said lateral panels to said main panel both interiorly and exteriorly thereof and extending throughout the length of the contiguous edges of said main and said lateral panels, said lateral panels being foldable into parallel relation with said main panel or into a position substantially at right angles thereto.

11. In a collapsible structure adapted for flotation, in combination with a transversely rigid main panel having at least one end tapered in width, a pair of lateral panels adapted to lie in parallel relation therewith and having edges conforming in contour with the edges of said main panel, said panels being longitudinally continuous and comprising material which has sufficient flexibility to be bent into curves lengthwise thereof, and means flexibly connecting each of said lateral panels to said main panel at both the inner and outer faces of said panels whereby said lateral panels may be moved into a position substantially at right angles to said main panel.

12. In a collapsible structure adapted for flotation, in combination with a transversely rigid main panel comprising longitudinally continuous material which is sufficiently flexible to be bent into curves in the direction of the length thereof, a lateral panel jointed to each edge of said main panel, and flexible means extending throughout the length of the contiguous edges of said main and lateral panels for enclosing said edges and securing said panels together, said flexible means forming a hinge whereby said lateral panels may be moved into a position substantially at right angles to said main panel.

13. In a collapsible structure adapted for flotation, in combination with a main panel having at least one end tapered in width, a lateral panel jointed to each edge of said main panel and having its edge contiguous to said main panel of substantially the same contour as the lateral edge of said main panel, and means flexibly connecting each of said lateral panels to said main panel and attached to said panels at both the inner and outer faces thereof, said lateral panels being foldable into parallel relation with said main panel or into a position substantially at right angles thereto and said lateral and main panels reacting in said last named position to bend each of said main and lateral panels into concave form.

14. In a collapsible structure adapted for flotation, a plurality of panels and means flexibly connecting the same and extending throughout the length of said panels, said last named means providing a flexible waterproof joint between said panels and comprising flexible strips attached to said panels interiorly and exteriorly thereof, and means connecting said strips between said panels to form a hinge.

15. In a collapsible structure adapted for flotation, a plurality of panels and means flexibly connecting the same and extending throughout the length of said panels, said last named means forming a waterproof casing for the edges of said panels and comprising flexible strips attached to said panels interiorly and exteriorly thereof, and means connecting said strips between said panels to form a hinge.

16. In a collapsible structure adapted for flotation, a plurality of panels and means flexibly connecting the same and extending throughout the length of said panels, said last named means comprising waterproof fabric strips extending lengthwise of said panels interiorly and exteriorly thereof, a waterproof adhesive between said strips and said panels, and stitching connecting said strips together between said joints to form a hinge.

17. In a collapsible structure adapted for flotation, a plurality of panels foldable into parallel relationship and having edges which form a convex curve in said position, and means flexibly connecting the same and extending throughout the length of said panels, said last named means providing a flexible waterproof joint between said panel and comprising fabric strips attached to said panels interiorly and exteriorly thereof, said exterior strip lying smoothly on said convex curve when said panels are in parallel relationship, and means connecting said strips between said panels to form a hinge.

18. In a collapsible structure adapted for flotation, the combination of a plurality of panels which are structurally continuous and made of material which is relatively rigid but bendable in the direction of its length with means flexibly connecting the contiguous edges of said panels throughout their lengths into a permanently united structure, said flexible connections embracing the edges of said panels and providing hinges whereby said panels may be moved with respect to each other to form a floatable structure.

In testimony whereof I have signed this specification.

NICHOLAS STRAUSSLER.